April 7, 1925.  1,532,773
E. R. I. NORDSTRÖM ET AL
METHOD OF MOUNTING THE HEATING ELEMENTS IN ELECTRIC HEATING APPARATUS
Filed May 19, 1923
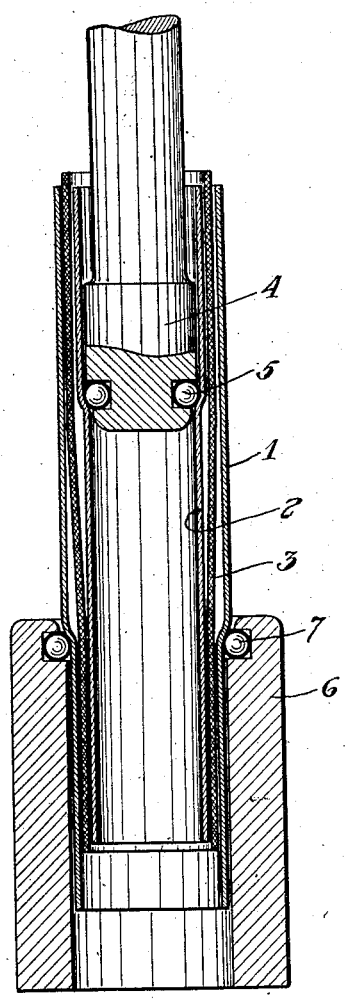
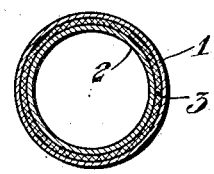
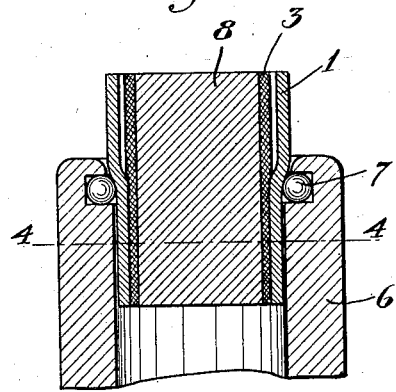
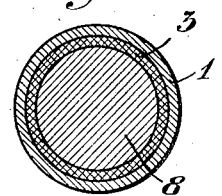
Inventor
E. R. I. Nordstrom
E. O. Johansson
by Marks & Clerk
Attys Patented Apr. 7, 1925.

1,532,773

UNITED STATES PATENT OFFICE.

ERNST RENFRID ISIDOR NORDSTRÖM AND ERNST OSCAR JOHANSSON, OF STOCKHOLM, SWEDEN, ASSIGNORS OF ONE-HALF TO HUGO TEODOR TILLQUIST, OF STOCKHOLM, SWEDEN.

METHOD OF MOUNTING THE HEATING ELEMENTS IN ELECTRIC-HEATING APPARATUS.

Application filed May 19, 1923. Serial No. 640,246.

*To all whom it may concern:*

Be it known that we, ERNST RENFRID ISIDOR NORDSTRÖM and ERNST OSCAR JOHANSSON, subjects of the King of Sweden, residing at, respectively, St. Eriksgatan 20, Stockholm, Sweden, and Fiskaregatan 9, Stockholm, Sweden, have invented certain new and useful Improvements in Methods of Mounting the Heating Elements in Electric-Heating Apparatus, of which the following is a specification.

As is well known, the heating effect of electric heating apparatus depends to a great extent on the parts of the apparatus surrounding the heating element being joined to the element as closely as possible. The more perfectly this may be effected, the more completely will, in the first place, the air be removed from between the element and its casing, so that the risk of oxidation of the element is lessened or eliminated and, in the second place, the element is brought in closer contact with the casing, so that the transmission of heat to the latter is facilitated.

In order thus to effect so to say a jamming of the element between the parts of the casing, it has hitherto been practice, among other methods, to attach the casing onto the element by contraction, that is to say, the casing is heated and slipped over the element, or the latter is introduced into the casing, which will then shrink on being cooled. It has also been endeavored to produce a tight fit by tightening up the casing about the element. And further, the casing has been evacuated, substantially in order to remove the air therefrom.

Experience has shown, however, that none of these methods will suffice for effecting so perfect a fit between the element and the casing that the contact will be maintained also when the element is heated, the drawback being mostly encountered that the casing expands and becomes twisted so that it is brought out of contact with the element, besides which cavities, wherein air may accumulate, are apt to form inside the casing.

With the present invention, all possibilities of such deformation of the casing are eliminated, the casing being pressed against the element with so great a force that a strong and entirely tight fit is maintained between both, whether the apparatus is heated or not.

The invention is principally characterized by the fact that, after the heating element has been placed between two sleeves one of which is inserted into the other, the sleeves are pressed together by mechanical means so strongly as to practically force out the air from the element and from between the sleeves, while the element will at the same time be brought in close contact with the two sleeves so as to facilitate the transmission of heat to the same.

The accompanying drawing illustrates a method of carrying the invention into effect, Fig. 1 shows a longitudinal section of two tubes one of which is thrust into each other, the said tubes having elements inserted therebetween, and all of the said parts being actuated from the outside and the inside by the tools by means of which they are forced together. Fig. 2 shows a cross section of the ready resistance made in accordance with Fig. 1. Fig. 3 is a longitudinal section of a tube and a mandrel inserted therein, an element being provided between the tube and the mandrel, and the said parts being actuated from the outside by means of chasing tools. Fig. 4 shows a cross section of the resistance made according to Fig. 3.

1 and 2 are the two tubes, one of which is introduced into the other, so that a space is formed between both, said space being adapted to occupy an element 3 inserted therein. 4 is a mandrel fitting the inner tube 2 and having near its end a number of easily rotatable steel balls 5 projecting outside the cylindrical surface of the mandrel. If the mandrel rotates while being introduced with its balls into the tube, the balls are caused to rotate and will force the wall of the tube outwards, so that the tube is widened. 6 is a tube surrounding the outer tube 1 and provided near its outer end, on the inside, with a number of easily rotating steel balls 7 projecting to a certain extent outside the inner cylindrical surface of the tube 6. When the latter rotates, the balls 7 are caused to press the wall of the tube inwards, so that the tube is compressed. In this way the walls of both tubes 1 and 2 will be compressed together about the element 3 inserted therebetween. Conditions will be the same if the tube rotates while the mandrel 4 and the tube 6 are standing still, or if the mandrel 4 and tube 6 as well as the tubes 1 and 2 rotate. The tightening thus effected will result in an element introduced between the tubes being very strongly jammed between them, while the air contained between the same is removed as completely as possible and a good contact, and thus a perfect transmission of heat between the tubes and the element is attained at the same time (see Fig. 2).

According to Fig. 3, the inner tube 2 is replaced by a mandrel 8, between which and the outer tube 1 is arranged the element 3. In this case too, the chasing of the outer tube 1 is effected by means of the tube 6 and the balls 7 thereof.

Obviously, the tightening may be effected in a number of other ways. Thus, for instance, the outer tube may be advantageously actuated on the outside by means of radially movable gripping jaws or the like between which the tube is rotated stepwise and alternately with a motion to and fro of the gripping jaws in a radial direction.

The method is of course applicable in all such cases where a heating element has to be enclosed between two sleeves, one of which surrounds the other.

What we claim as new and desire to secure by Letters Patent of the United States of America is:—

1. A method of mounting the heating element of electrical heating apparatus between an inner member and a sleeve-like outer member, consisting in compressing the sleeve like member until the air is substantially exhausted from between the heating element and the inner and outer elements and close contact between the latter is established.

2. A method of mounting the heating element of electrical heating apparatus between inner and outer sleeve-like members consisting in compressing the sleeve-like outer member and expanding the sleeve-like inner member until the air between the inner and outer members and the heating member is exhausted and close contact is established between the heating elements and the inner and outer members.

In testimony whereof we affix our signatures in presence of two witnesses.

ERNST RENFRID ISIDOR NORDSTROM.
ERNST OSCAR JOHANSSON.

ERIC HAKJER,
HANS DAHLQUIST.